United States Patent
Forte et al.

(10) Patent No.: US 10,437,469 B2
(45) Date of Patent: *Oct. 8, 2019

(54) SECURE INTERACTIONS INVOLVING SUPERIMPOSING IMAGE OF A VIRTUAL KEYPAD OVER IMAGE OF A TOUCHSCREEN KEYPAD

(71) Applicant: AT&T Intellectual Property I, L.P., Atlanta, GA (US)

(72) Inventors: Andrea Forte, Brooklyn, NY (US); Juan A. Garay, San Francisco, CA (US); Trevor Jim, Princeton, NJ (US); Evgene Vahlis, Toronto (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/374,337

(22) Filed: Dec. 9, 2016

(65) Prior Publication Data
US 2017/0090750 A1     Mar. 30, 2017

Related U.S. Application Data

(63) Continuation of application No. 14/094,167, filed on Dec. 2, 2013, now Pat. No. 9,529,465.

(51) Int. Cl.
*G06F 9/48* (2006.01)
*G06F 3/0488* (2013.01)
(Continued)

(52) U.S. Cl.
CPC .......... *G06F 3/04886* (2013.01); *G06F 3/041* (2013.01); *G06F 3/0412* (2013.01);
(Continued)

(58) Field of Classification Search
CPC .... G06F 3/04886; G06F 3/041; G06F 3/0412; G06F 3/0488; G06F 21/83; H04L 9/14;
(Continued)

(56) References Cited

U.S. PATENT DOCUMENTS 6,209,102 B1  3/2001  Hoover
6,611,253 B1  8/2003  Cohen
(Continued)

FOREIGN PATENT DOCUMENTS

EP      1 181 643 B1       9/2006
WO   WO 03/060674 A1    7/2003

*Primary Examiner* — Jennifer N To
*Assistant Examiner* — K C Chen
(74) *Attorney, Agent, or Firm* — Myers Bigel, P.A.

(57) ABSTRACT

Methods of obtaining input on a physical input device are provided. A method includes superimposing an image of a virtual keypad over an image of a touchscreen keypad, wherein the virtual keypad device has a different layout than the touchscreen keypad, mapping a first input on the touchscreen keypad to a second input on the virtual keypad, wherein the second input is different from the first input, and displaying on the touchscreen keypad a visually encoded symbol that defines a mapping from the touchscreen keypad to the virtual keypad, wherein mapping the first input on the touchscreen keypad to the second input on the virtual keypad is performed in response to the visually encoded symbol.

18 Claims, 13 Drawing Sheets

(51) Int. Cl.
*G06F 21/83* (2013.01)
*G06F 3/041* (2006.01)
*G06Q 20/10* (2012.01)
*G06Q 20/20* (2012.01)
*G06Q 20/32* (2012.01)
*G06Q 20/34* (2012.01)
*G06Q 20/38* (2012.01)
*G06Q 20/40* (2012.01)
*G07F 7/10* (2006.01)
*H04L 9/08* (2006.01)
*H04L 9/14* (2006.01)
*H04L 9/30* (2006.01)

(52) U.S. Cl.
CPC ............ *G06F 3/0488* (2013.01); *G06F 21/83* (2013.01); *G06Q 20/1085* (2013.01); *G06Q 20/204* (2013.01); *G06Q 20/206* (2013.01); *G06Q 20/3227* (2013.01); *G06Q 20/3276* (2013.01); *G06Q 20/3278* (2013.01); *G06Q 20/34* (2013.01); *G06Q 20/385* (2013.01); *G06Q 20/3825* (2013.01); *G06Q 20/38215* (2013.01); *G06Q 20/4012* (2013.01); *G07F 7/1041* (2013.01); *H04L 9/0822* (2013.01); *H04L 9/14* (2013.01); *H04L 9/30* (2013.01)

(58) Field of Classification Search
CPC ..... H04L 9/30; H04L 9/0822; G06Q 20/1085; G06Q 20/204; G06Q 20/206; G06Q 20/3227; G06Q 20/3276; G06Q 20/3278; G06Q 20/34; G06Q 20/38215; G06Q 20/3825; G06Q 20/385; G06Q 20/4012; G07F 7/1041

See application file for complete search history.

(56) References Cited

U.S. PATENT DOCUMENTS

| | | | |
|---|---|---|---|
| 6,614,422 | B1 | 9/2003 | Rafii et al. |
| 7,071,924 | B2 | 7/2006 | Wilbrink et al. |
| 8,176,324 | B1 | 5/2012 | Krishnamurthy |
| 8,427,438 | B2 | 4/2013 | Louch |
| 2005/0044395 | A1 | 2/2005 | Staring et al. |
| 2006/0069926 | A1 | 3/2006 | Ginter et al. |
| 2010/0169818 | A1 | 7/2010 | Hughes et al. |
| 2010/0177035 | A1 | 7/2010 | Schowengerdt et al. |
| 2010/0227006 | A1 | 9/2010 | Pak et al. |
| 2010/0245260 | A1 | 9/2010 | Louch |
| 2010/0261465 | A1* | 10/2010 | Rhoads .................. G08C 17/00 455/420 |
| 2011/0225638 | A1 | 9/2011 | Nahari |
| 2011/0260976 | A1 | 10/2011 | Larsen et al. |
| 2011/0310019 | A1 | 12/2011 | Wilson |
| 2012/0001922 | A1 | 1/2012 | Escher et al. |
| 2012/0227006 | A1 | 9/2012 | Amm |
| 2012/0266224 | A1* | 10/2012 | Gruschka ................ G06F 21/35 726/7 |
| 2014/0310531 | A1* | 10/2014 | Kundu .................... G06F 21/35 713/186 |
| 2014/0337634 | A1* | 11/2014 | Starner ................. H04L 9/3231 713/186 |

* cited by examiner

SECURE INTERACTIONS INVOLVING SUPERIMPOSING IMAGE OF A VIRTUAL KEYPAD OVER IMAGE OF A TOUCHSCREEN KEYPAD

RELATED APPLICATION

This application is a continuation of U.S. patent application Ser. No. 14/094,167, filed Dec. 2, 2013, now U.S. Pat. No. 9,529,465, the disclosure of which are hereby incorporated herein by reference as if set forth in their entirety.

BACKGROUND

The use of electronic terminals to facilitate commercial transactions is becoming increasingly common. Financial transactions are conducted not only at automatic teller machines (ATMs), but also increasingly at point of sale locations, such as grocery stores, gas stations, and the like. In a typical financial transaction, after a user's debit card is scanned or swiped, the user is prompted to enter a personal identification number, or PIN code, to verify the identity of the user and authorize the transaction. For this reason, it is imperative that PIN codes be kept secret and not be disclosed to third parties. However, one concern that users may have is that a bystander may see the user enter the PIN code into the terminal, which may compromise the security of the user's account. A user may therefore want to ensure that people in the vicinity of the user are not able to "spy" as the user is interacting with the electronic terminal. In addition, malware on a device used to conduct a transaction can compromise the security of the transaction.

SUMMARY

Some embodiments provide methods of obtaining input on a physical input device. According to some embodiments, a virtual input device is superimposed over the physical input device. The virtual input device has a different layout than the physical input device, such that a first input on the physical input device is mapped to a different input on the virtual input device.

Superimposing the virtual input device over the physical input device may include capturing an image of the physical input device, generating a modified image of the physical input device including the virtual input device superimposed over the physical input device, and displaying the modified image to a user.

The physical input device may include a touchscreen, and the methods may further include displaying on the touchscreen a visually encoded symbol that defines a mapping from the physical input device to the virtual input device. Mapping the first input on the physical input device to the second input on the virtual input device may be performed in response to the visually encoded symbol.

The methods may further include reading the visually encoded symbol and generating the virtual input device in response to the visually encoded symbol.

The visually encoded symbol may include a barcode.

The methods may further include changing a mapping from the virtual input device to the physical input device after receiving the first input on the physical input device.

Changing the mapping may include rearranging input keys on the virtual input device.

The physical input device may include a touchscreen, and the methods may further include capturing an encrypted image from the touchscreen, generating a decrypted version of the encrypted image, and superimposing the decrypted version of the encrypted image over the touchscreen.

The methods may further include capturing a visually encoded symbol displayed on the physical input device, generating a passphrase in response to the encoded token, and displaying the passphrase to the user.

The methods may further include receiving an encrypted image, an encrypted document key and a tag that identifies the encrypted image, transmitting the tag to an application server, receiving a shared key from the application server, decrypting the document key using the shared key, decrypting the encrypted image using the document key, and displaying the decrypted image to the user.

Decrypting the encrypted image may include decrypting a passphrase, and the methods may further include displaying the passphrase to the user.

Methods of securing a transaction according to some embodiments include encrypting an image of an input screen using a document key, encrypting the document key using a public key, and transmitting the encrypted image and the encrypted document key to a user device.

Transmitting the encrypted image to the user device may include displaying the encrypted image on a display device.

The methods may further include generating a tag identifying the image of the input screen, generating a visually encoded symbol containing the tag, the encrypted document key, and a signature of the tag, and displaying the visually encoded symbol on the display device.

The methods may further include receiving an input on an input device, and mapping the input to the input screen.

Methods of securing a transaction according to further embodiments include displaying a first input screen to a user, encrypting a scrambling key using a public key, the scrambling key defining a second input screen that has a different layout from the first input screen, transmitting the encrypted scrambling key to a user device, receiving an input from the user device, and mapping the input to the second input screen.

The methods may further include generating a tag identifying the image of the input screen, generating a visually encoded symbol containing the tag, the encrypted scrambling key, and a signature of the tag, and displaying the visually encoded symbol on the display device.

An apparatus according to some embodiments includes a camera that generates an image of a physical input device, a processor that generates an image of a virtual input device and superimposes the image of a virtual input device over the image of the physical input device, wherein the virtual input device has a different layout than the physical input device, and a screen that displays the virtual input device superimposed over the physical input device to a user.

Methods of securing a transaction according to further embodiments include visually encrypting a symbol using a document key, wherein the symbol includes an identification code, encrypting the document key using a public key, transmitting the visually encrypted symbol and the encrypted document key to a user device, and receiving input of the identification code from a user.

Transmitting the visually encrypted symbol to the user device may include displaying the visually encrypted symbol on a display device.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Figure 1:
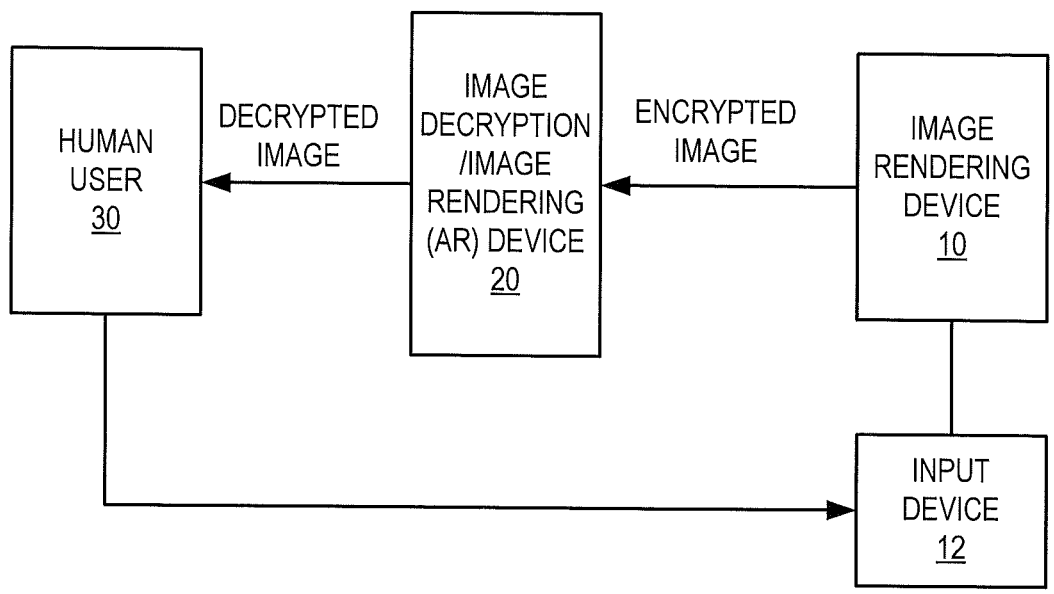
FIG. 1 is a block diagram of a system according to some embodiments.

Embodiments of the present inventive concepts are directed to systems and methods for securing interactions with data input systems, such as keypads, touchscreens, etc. According to some embodiments, a data input device or an image generated by a data input device is presented to a user. A camera captures the image presented by the data input device, or an image of the data input device, and a processor modifies the image. A display device presents the modified image to the user, and the user interacts with the actual data input device based on the modified image presented to the user.

In particular, the present disclosure broadly discloses methods, non-transitory (i.e., tangible or physical) computer readable storage media, and apparatuses that may enhance security of data entry using publicly viewable input devices, such as ATMs, credit/debit card readers and the like.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
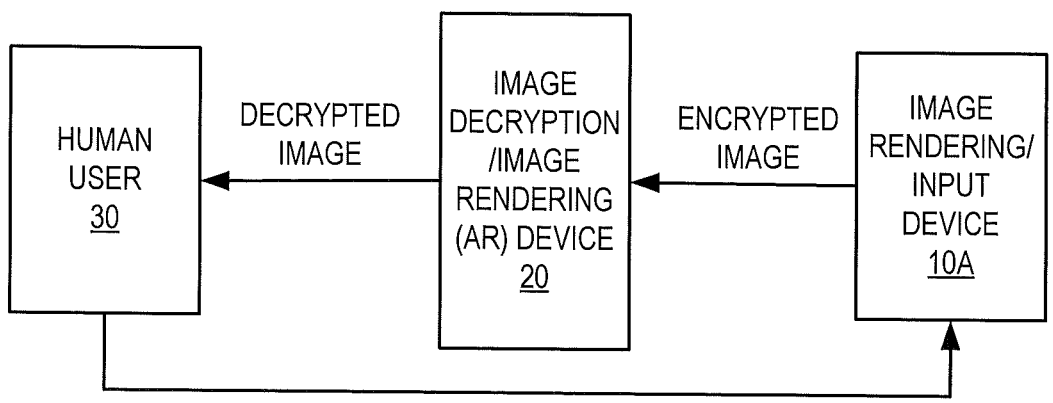
FIG. 2 is a block diagram of a system according to further embodiments.

FIG. 1 is a block diagram of a system according to some embodiments, and FIG. 2 is a block diagram of a system according to further embodiments. Referring to FIG. 1, an image rendering device 10 is coupled to an input device 12. The image rendering device 10 generates and displays an encrypted image. An image decryption and virtual image rendering device 20 captures the encrypted image and decrypts the encrypted image. The decrypted image is then displayed to a user 30, who interacts with the input device 10 based on the decrypted image displayed to the user 30.

The input device 12 may, for example, be a keyboard or keypad, and the image rendering device 10 may be a display, such as an LCD display.

Figure 14:
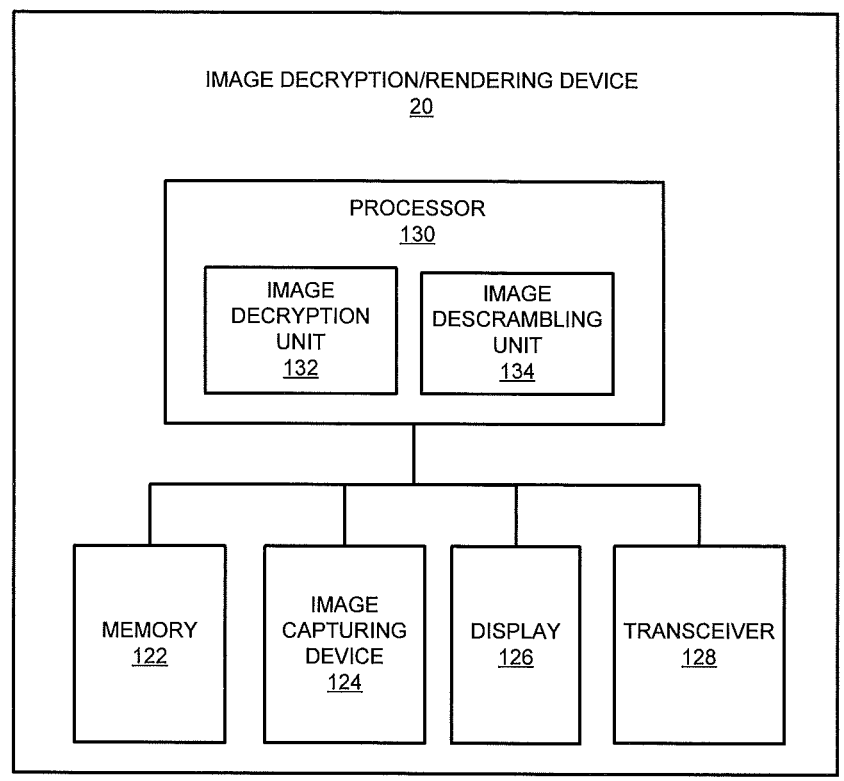
FIG. 14 is a block diagram of an image decryption and virtual image rendering device according to some embodiments.

In one embodiment, the device 20 may be any single device or a combination of devices that is capable of capturing an image, implementing encryption and decryption algorithms and having a display. In one embodiment, the device may be a mobile endpoint device, such as for example, a cell phone, a smart phone, a tablet, a net book, a laptop computer, an eye wear such as glasses, and the like that is capable of communicating over a communication network, either wirelessly or via a wired connection. In one embodiment, the device 20 may comprise a mobile endpoint device having a camera or video camera and that is in communication with a pair of augmented reality decryption glasses lacking an image capture device. In another embodiment, the device 20 may be implemented as a pair of augmented reality glasses having a display and a camera with wireless capabilities to communicate with a communication network. For convenience, the image decryption and virtual image rendering device 20 may be referred to as an augmented reality device 20, or more simply, an AR device 20. In some embodiments, the AR device 20 may be implemented as a computing device as illustrated in FIG. 14, discussed below.

The system of FIG. 2 is similar to the system of FIG. 1, except that the image rendering device and input device are combined into a single image rendering/input device 10A, which may, for example, be a touchscreen display that displays a keypad, interactive buttons, etc.

Figure 3:
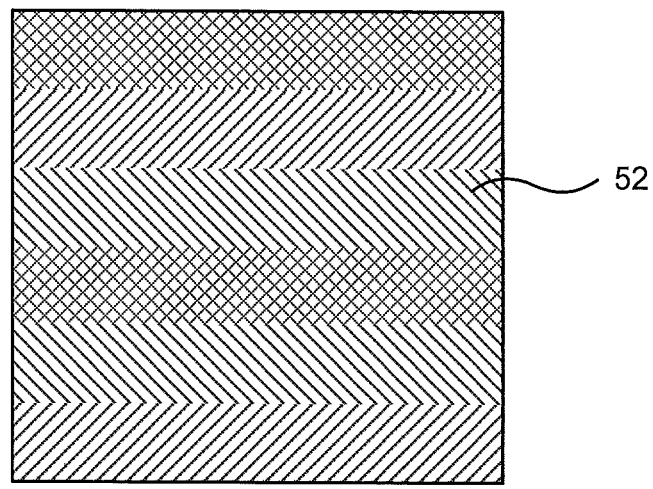
FIG. 3 illustrates an encrypted image that may be generated by a system according to some embodiments.

FIG. 3 illustrates an encrypted image 52 that may be generated by a system according to some embodiments. The encrypted image 52 may be encoded in such a way that it cannot be naturally interpreted by a human being. The encrypted image 52 may be displayed on the image rendering device 10 of FIG. 1 of the image rendering/input device 10A of FIG. 2.

The encrypted image 52 is captured by the AR device 20 and decrypted to generate a decrypted image 54 that is displayed by the AR device 20 to the user 30.

Figure 4:
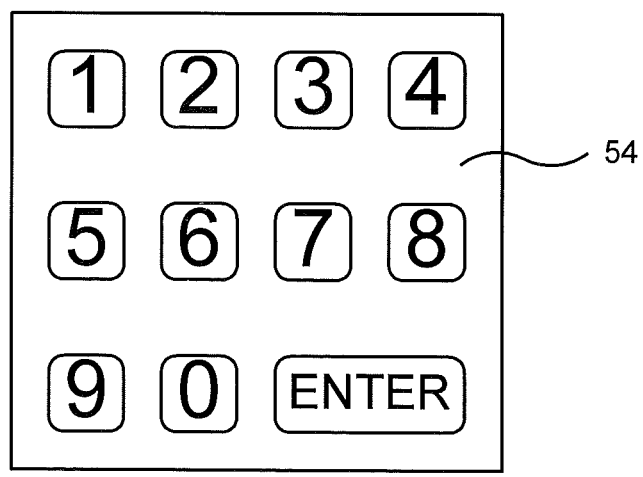
FIG. 4 illustrates a decrypted image that may be generated by a system according to some embodiments.

FIG. 4 illustrates a decrypted image 54 that may be generated by a system according to some embodiments. For example, the decrypted image may depict a numeric keypad that can correspond to the input device 12 or the image rendering/input device 10A. However, the decrypted image need not be a keypad, but can be any desired image that enables the user to interact with the input device 12 or the image rendering/input device 10A. In some embodiments, as discussed in more detail below, the decrypted image may provide the user with a one-time use password that can be input into the input device 12 or the image rendering/input device 10A to authenticate the user.

It will be appreciated that without the action of the AR device 20, the encrypted image 52 cannot be interpreted by a human user. Thus, a bystander viewing the image rendering device 10 or image rendering/input device 10A would not be able to understand the image or correctly interpret the user's interaction with the input device 12/image rendering/input device 10A. Moreover, malware (e.g., spyware, Trojan horses, viruses, etc.) that may be running on the rendering device would not be able to correctly interpret the user's interaction with the device.

Figure 5:
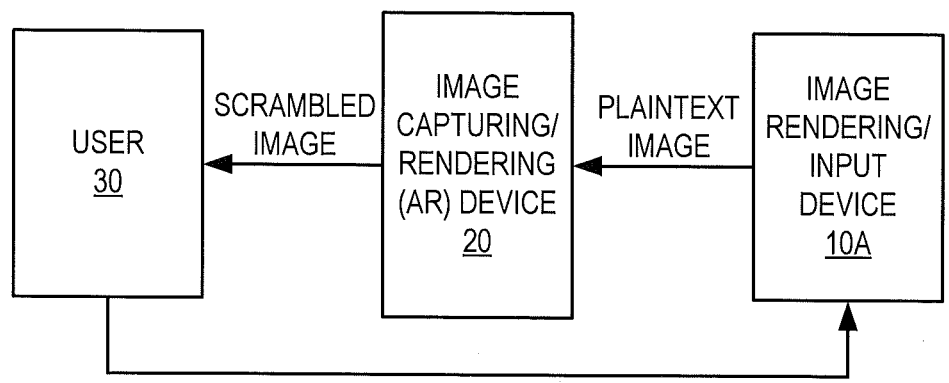
FIG. 5 is a block diagram of a system according to further embodiments.

FIG. 5 is a block diagram of a system according to further embodiments. In the embodiments of FIG. 5, the image rendering/input device 10A displays a plaintext, or unencrypted image to the user. The AR device 20 captures the plaintext image and scrambles the plaintext image to form a human-readable scrambled image. The scrambled image is then displayed to the user 30, who may interact with the image rendering/input device 10A using the scrambled image. Thus, a bystander may see the plaintext image on the image rendering/input device 10A but may not be able to correctly interpret the user's interaction with the image rendering/input device 10A.

Figure 6:
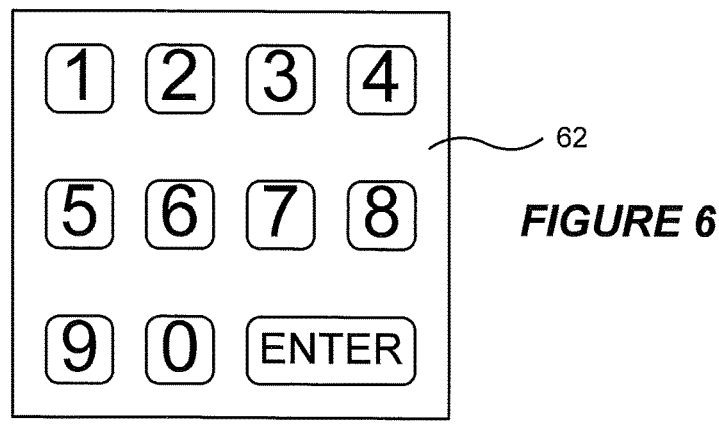
FIG. 6 illustrates a plaintext image that may be generated by a system according to some embodiments.

For example, FIG. 6 illustrates an example of a plaintext image 62 that may be displayed on the image rendering/ input device 10A according to some embodiments. In this example, the plaintext image is a keypad, but the invention is not so limited.

Figure 7A:
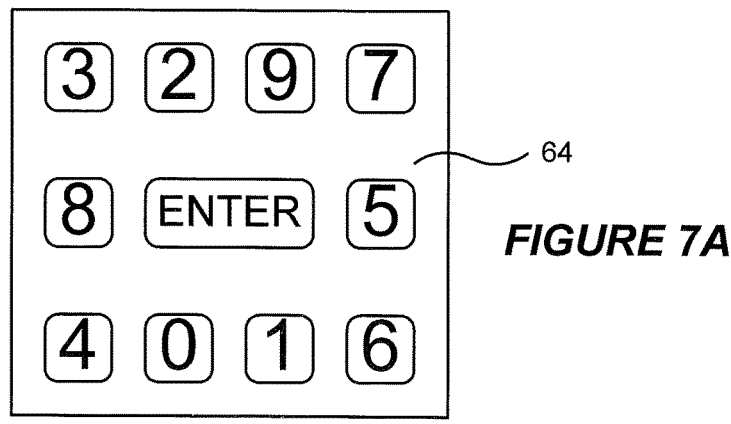
FIGS. 7A and 7B illustrate scrambled images that may be generated by a system according to some embodiments.

FIG. 7A illustrates a scrambled image 64 that may be generated by the AR device 20 and displayed to the user. As can be seen in FIG. 7A, the scrambled image 64 has rearranged the input buttons of the keypad. Thus, for example, when a user presses the '1' button displayed on the image rendering/input device 10A, the input '3' is actually registered by the image rendering/input device 10A. The scrambling may be performed in response to a visually encoded symbol, such as a barcode, displayed on the image rendering/input device 10A, so that the image rendering/ input device 10A controls the placement of the virtual buttons displayed to the user.

Figure 7B:
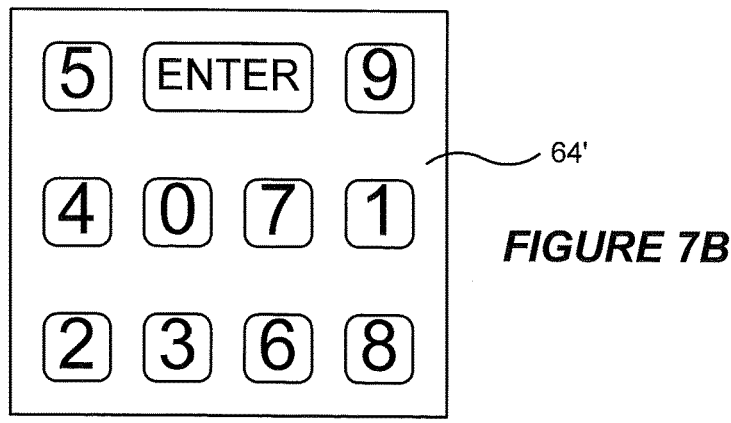

Each time a key is pressed, the image may be rearranged to provide a different arrangement of virtual keys. For example, as shown in FIG. 7B, after a virtual key is pressed, the plaintext image may be rearranged to form a new scrambled image 64' in which the buttons appear in different locations. In this way, for example, the fact that the user is pressing the same number consecutively can be concealed.

Figure 8:
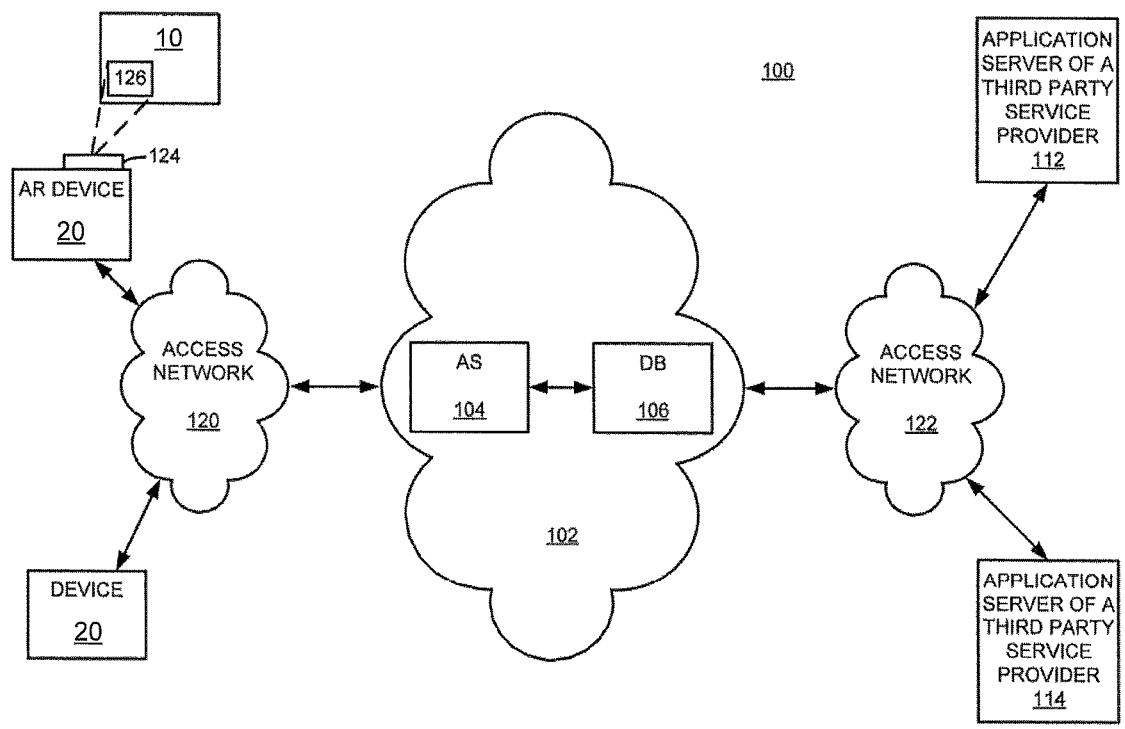
FIG. 8 is a block diagram illustrating a communication system according to some embodiments.

FIG. 8 is a block diagram depicting one example of a communication network 100 in which embodiments of the inventive concepts may be deployed. The communication network 100 may be any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets. Additional exemplary IP networks include Voice over IP (VoiP) networks, Service over IP (SoiP) networks, and the like.

In one embodiment, the network 100 may comprise a core network 102. The core network 102 may be in communication with one or more access networks 120 and 122. The access networks 120 and 122 may include a wireless access network (e.g., an IEEE 802.11/Wi-Fi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 15:
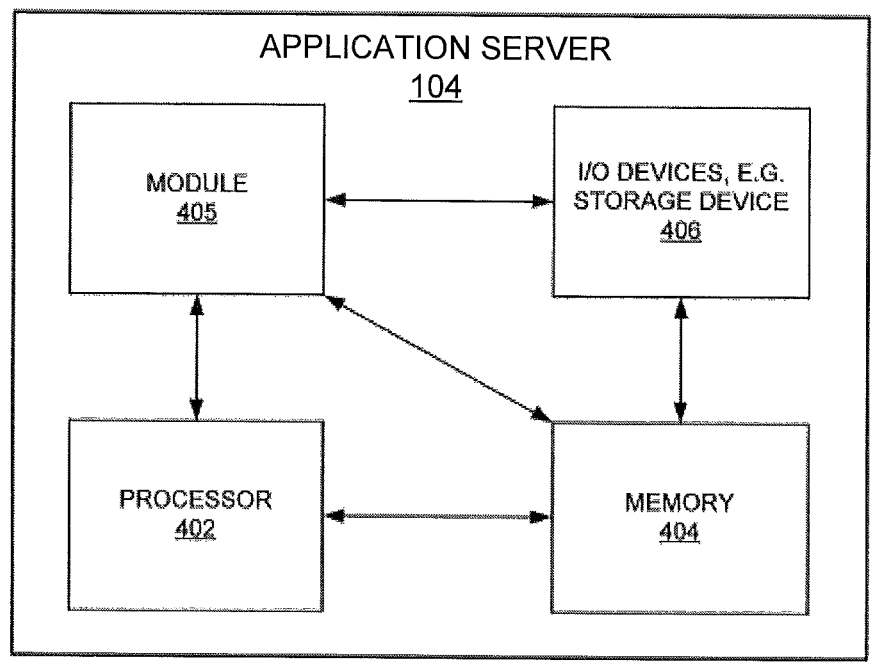
FIG. 15 is a block diagram of a processing device according to some embodiments.

In one embodiment, the AS 104 may be implemented as a general purpose computer as illustrated in FIG. 15, discussed below. In one embodiment, the DB 106 may store personal information of the subscribers of the communication network 100, such as the subscribers' user identification (uid), public and private key information, encryption and decryption keys, and the like. In some embodiments, the core network 102 may be operated by a communication network service provider.

In some embodiments, the access network 120 may be in communication with one or more image decryption/image rendering devices 20. In one embodiment, the image decryption/image rendering devices 20 may be augmented reality (AR) devices, with each device having an image capturing device 124. In some embodiments, the image capture device 124 may be used to capture at least a portion 126 of an input device, e.g., displayed by an image rendering/input device 10, e.g., a screen, a monitor and the like.

In some embodiments, the input device 10 may be any device having a display capable of displaying an image. For example, the input device 10 may be an automated teller machine (ATM), a point of sale terminal, a mobile device, a laptop, a tablet computer, a desktop computer, a cellphone, and the like. The image may be an electronic document (e.g., a web page on a computer monitor, an electronic email, a word processing document, a spreadsheet, and the like), or even a video comprised of a series of frames displayed by the device 10.

In some embodiments, the AR device 20 may be any single device or a combination of devices that is capable of capturing an image, implementing encryption and decryption algorithms and having a display. In some embodiments, the AR device may 20 be a mobile endpoint device, such as for example, a cell phone, a smart phone, a tablet, a net book, a laptop computer, a smart watch, an eye wear such as glasses, and the like that is capable of communicating over a communication network, either wirelessly or via a wired connection. In some embodiments, the AR device 20 may comprise a mobile endpoint device having a camera or video camera and that is in communication with a pair of augmented reality decryption glasses lacking an image capture device. In other embodiments, the AR device 20 may be implemented as a pair of augmented reality glasses having a display and a camera with wireless capabilities to communicate with the communication network 100. In some embodiments, the AR device 20 may be implemented as a computing device as illustrated in FIG. 14 and discussed below.

In some embodiments, the access network 122 may be in communication with one or more third party service providers 112 and 114. For example, the third party service providers 112 and 114 may include service providers such as, for example, a financial institution, e.g., a bank, a health care provider, e.g., a doctor, a hospital, a medical laboratory, and the like. In some embodiments, the third party service providers 112 and 114 may provide access to a user through the input device 10. In some embodiments, the access network 122 is connected to one or more computers or local networks of the respective third party service providers 112 and 114, e.g., to enable the provisioning, transmission and reception of documents, logon screens, password prompts, encryption and decryption keys, and so forth.

It should be noted that the network 100 has been simplified. For example, the network 100 may include other network elements (not shown) such as border elements, routers, switches, policy servers, security devices, gateways, a content distribution network (CDN) and the like.

In some embodiments an image, such as an image of a keypad or logon screen, may be visually encoded by dividing the image or video frame of the image into blocks. However, it should be noted that cipher blocks are not visible in the visual encoding. In some embodiments, taking into account color and light balance, the image of the document is encoded using a gray scale or colors with enough separation between the gray scales or colors so that instead of trying to identify the actual color (e.g., blue vs. yellow), a device is able to distinguish between different gray scales or colors (i.e., color 1 vs. color 2). Each block may then be individually encrypted using the Advanced Encryption Standard (AES). In some embodiments, the encryption may be performed using a random nonce.

In some embodiments, the encryption may be performed by using an n×m matrix of the blocks. For example, a per-document encryption key Kdoc can be used to encrypt the matrix block by block. In one embodiment, the cell in row i and column j may be encrypted according to a function $Cij=[i, j, F_{Kdoc}(i, j) \oplus Mij]$, where F is a block cipher, such as AES. The above encryption method may use less memory and be more efficient than other currently used methods of encryption. However, it should be noted that embodiments of the present disclosure may employ both symmetric and asymmetric block ciphers and/or keys. Thus, in one instance Kdoc is a symmetric key that is used for both encrypting and decrypting operations. In another instance, Kdoc comprises a public key. A person or device in possession of the corresponding private key would then be able to decipher the document, or blocks of the document that are encrypted using the public key Kdoc. Accordingly, the term "key", as used herein, may also be understood to refer to a public-private key pair in various instances.

Figure 9A:
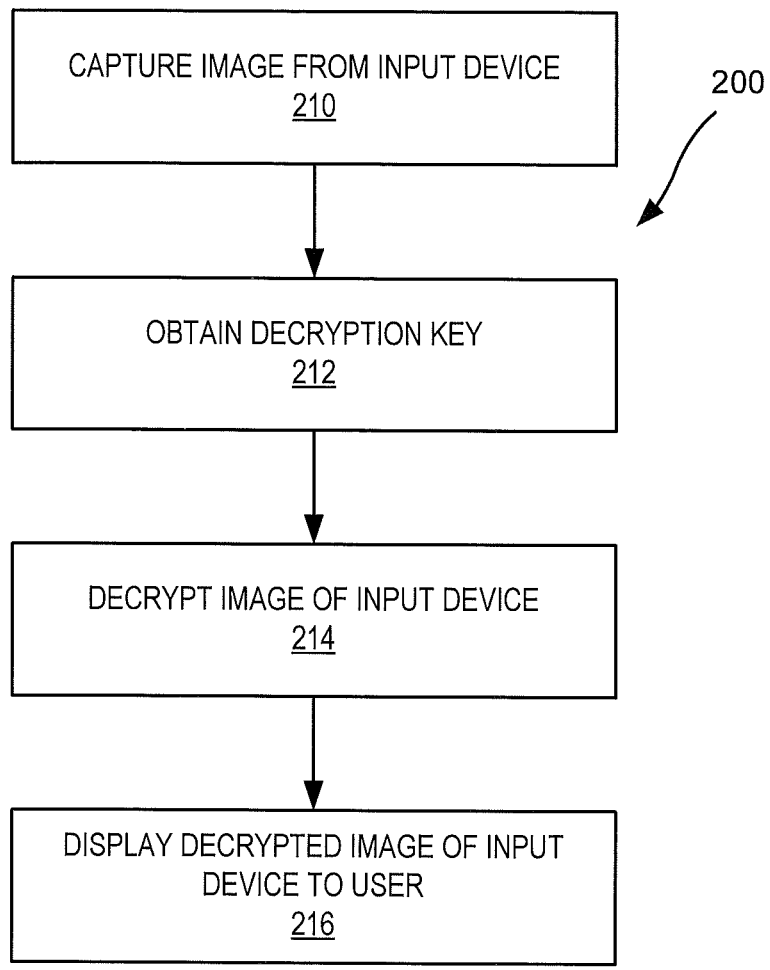
FIG. 9A is a flowchart illustrating operations according to some embodiments.

Operations 200 according to some embodiments are illustrated in FIG. 9A. These operations may be performed by an AR device 20. As shown therein, an encrypted image is captured from an input device, such as a touchscreen display or POS terminal (Block 210). A decryption key is then obtained (Block 212). The decryption key is then used to decrypt the encrypted image (Block 214), and the decrypted image is displayed to the user (Block 216). The user may then interact with the input device using the decrypted image that is displayed to the user. These operations are described in more detail below.

In one embodiment, the encryption is performed by any one or more of the Application Server (AS) 104, a device of the third party service provider 112, a device of the third party service provider 114, or a computing device such as described in connection with FIG. 15, below. In some embodiments, the key received at Block 212 comprises a decryption key that is complimentary to the encryption key Kdoc and is received at Block 212 from any one or more of such devices. For instance, the decryption key may be received directly from a device that performs the encryption. In another example, a third party service provider encrypts the image while the decryption key is received at step 212 from the AS 104 of communication network 102. For example, the third party service provider 112 may register with an application server (or any hardware equivalents or systems) of a communication network service provider of the communication network 102. For example, the third party service provider 112 may be a bank and the communication network service provider may be a cellular communication service provider that provides mobile communication services to subscribers and/or operates the core network 102. As such, the communication network service provider may perform an authentication, e.g., of a device performing the operations 200. For example, the device may be required to request the decryption key from the core network 102. In addition, to ensure that a user is not trying to decrypt a document that belongs to another individual (e.g., a user reading over the shoulder of another user), the communication network service provider may verify that the ID of the user matches an ID of the device, or may use a login and password that is associated with both the device and the user. If the authentication is successful, the communication network service provider then sends the decryption key for the document which is received at Block 212.

Figure 9B:
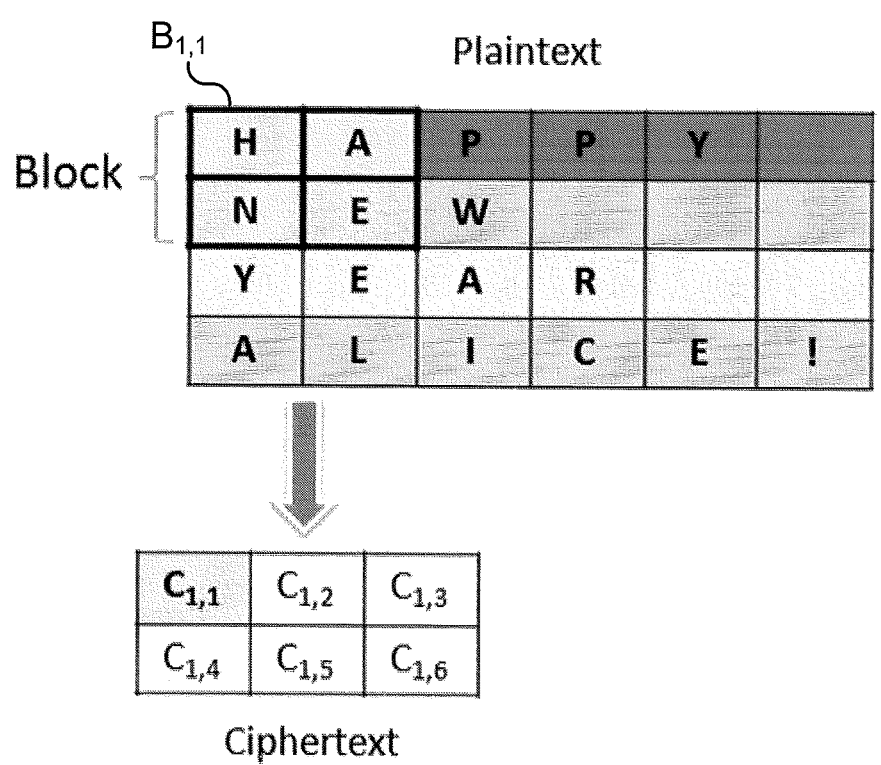
FIG. 9B illustrates encoding of a plaintext image according to some embodiments.

Encryption may be performed on a block by block basis. For example, as shown in FIG. 9B, a block of plain text can be visually encoded into a corresponding block of ciphertext based on row and column indices of the plaintext. The visually encoded block ciphertext may be displayed in the same location as the block of plaintext that was encoded to form the block of ciphertext. That is, for example, a visually encoded block of ciphertext $C_{1,1}$ that was generated by encoding a block $B_{1,1}$ of plaintext may be displayed in the encrypted image in the same location as the block $B_{1,1}$ of plaintext appears in the plaintext image.

Encoding may be performed as follows:

$$\text{Enc}_{Kdoc}(M,i,j) = \text{PRF}(K_{doc,enc}(i,j) \oplus M, t, i, j) \quad [1]$$

where t is a message authentication code generated by:

$$t = \text{MAC}_{Kdoc,mac}(\text{PRF}_{Kdoc,enc}(i,j) \oplus M) \quad [2]$$

where PRF is a pseudorandom function.

Decryption may then be performed as follows:

$$\text{DecKdoc}(Ci,j,t,i,j) = Ci,j \oplus \text{PRF Kenc,doc}(i,j,) \quad [3]$$

Referring again to FIG. 9A, in Block 210, the operations may visually capture the encrypted image using an image capturing device, e.g., a camera. In one embodiment, the operations 200 request an encrypted input screen from a core network and/or third party service provider and, in response, is provided with an encrypted input screen. Notably, the image is visually encrypted, e.g., using a technique as described above. As such, the image may contain sensitive, private or confidential information but is not discernible in the present format in which the image is presented.

At Block 214, the operations 200 decrypt the portion of the encrypted image that is captured at Block 210. In some embodiments, the decryption key received at block 212 is used to perform the decryption of the image at Block 214. Notably, any available decryption algorithm may be used to decrypt the encrypted data and to decrypt a portion or subset of the entire document.

At Block 216, the operations 200 display the captured portion of the image that is decrypted.

Figure 9C:
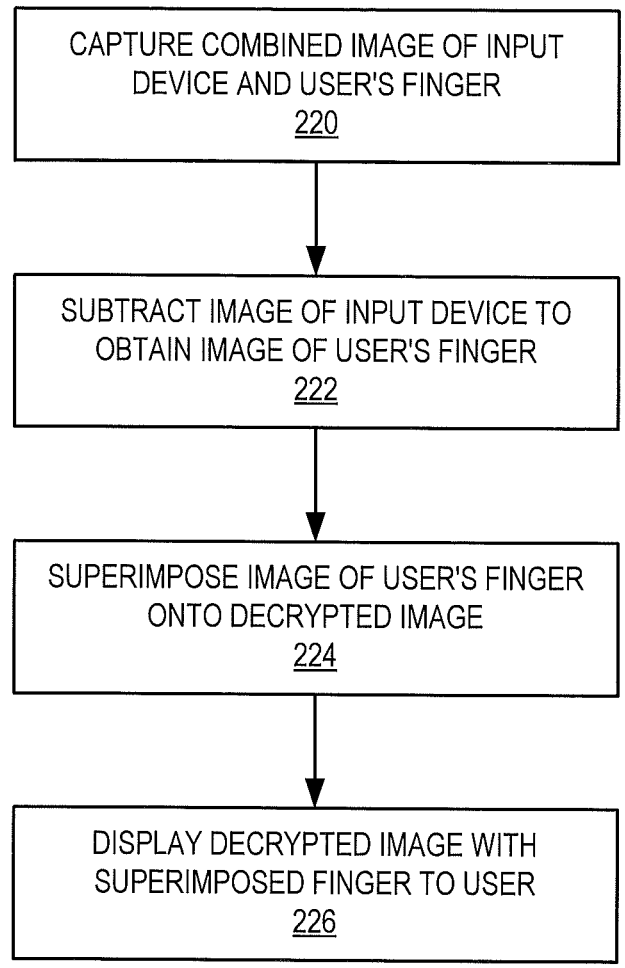
FIG. 9C is a flowchart illustrating operations according to some embodiments.

FIG. 9C illustrates additional operations that may be performed by an AR device 20 as the user interacts with the input device. In particular, the AR device 20 may capture a combined image of the input device and the user's finger, stylus, or other object used to interact with the input device (Block 220). The AR 20 may subtract the image of the input device from the combined image to obtain an image of only the user's finger, etc. (Block 222). The image of the user's finger, etc., may then be superimposed onto the decrypted image (Block 224), and the decrypted image including the image of the user's finger may be displayed to the user (Block 226). Thus, when the user is viewing the input device through the AR device 20, it appears to the user that he or she is interacting with the decrypted image rather than the encrypted image.

Figure 10:
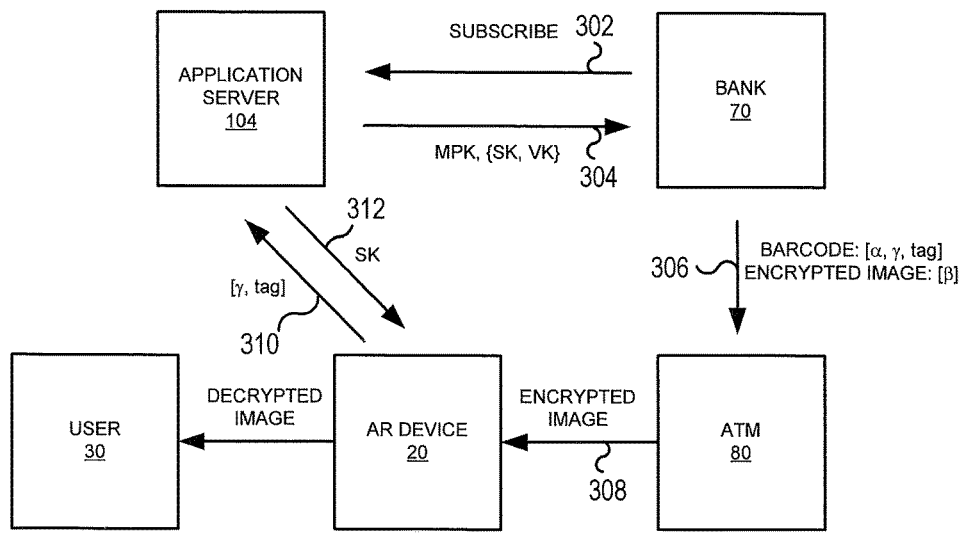
FIG. 10 is a block diagram illustrating message flows in a system according to some embodiments.

FIG. 10 is a block diagram illustrating message flows in systems according to some embodiments. The system illustrated in FIG. 9 includes an application server 104, a third party service provider, namely a bank 70, an input device, namely, an ATM 80 associated with the bank 70, and an AR device 20 that is operated by a user 30.

Referring to FIG. 10, the bank 70 subscribes to a secure input service offered by a service provider that operates the application server 104 (arrow 302). In response, the application server 104 provides the bank 70 with a master public key (MPK) associated with the application server 104 along with a symmetric key (SK) and verification key (VK) associated with the bank (arrow 304).

When a user wishes to interact with the ATM 80, he or she may initiate a secure interaction by, for example, pressing a designated button on the display. Alternatively or additionally, the AR 20 may be equipped with near field communications (NFC) or RFID communications capability that may communicate with the ATM to identify the user to the ATM.

The bank 70 may then generate an encrypted input screen by encrypting a plaintext input screen using a unique key Kdoc. The encrypted image (β) is sent to the ATM to be displayed to the user (arrow 306). The bank may also send a barcode that can be displayed to the user that encodes an identification tag along with an encrypted copy (α) of the document key Kdoc and a signature (γ) that authenticates the tag using the symmetric key SK. The document key may be encrypted using the master public key MPK and the tag. The tag may, for example, identify a userid (uid), a document id (docid), the bank name, and the date. That is, the tag may be defined as Tag:[uid, docid, Bank, Date]. The other parameters may be defined mathematically as:

$$\alpha = \text{Enc}_{MPK,tag}(Kdoc) \quad [4]$$

$$\beta = \text{Enc}_{Kdoc}(Doc) \quad [5]$$

$$\gamma = \text{Sig}_{SK}(Tag) \quad [6]$$

The encrypted image is then displayed to the user (arrow 308), and is captured by the AR device 20.

The AR device 20 sends the tag and the signature γ to the application server 104 (arrow 310). The application server 104 responds by providing the symmetric key SK to the AR Device 20 (arrow 312). The symmetric key SK is then used by the AR device 20 to decrypt the document key Kdoc, and the document key Kdoc is used to decrypt the encrypted image β.

In some embodiments, the symmetric key SK may be unique to the user 30, so that even if a bystander were to observe the encrypted image with his or her own AR device that communicates with the application server 104, the bystander would still not be able to successfully decrypt the image.

According to still further embodiments, the encrypted image may include a one-time use passphrase that may be entered by the user into the input device to authenticate the user. In this manner, the user may not have to remember a PIN code or other passphrase in order to authenticate himself or herself. Because the symmetric key SK may be unique to the user and only the user may see the decrypted image, the user may be authenticated by entering the one-time use passphrase back into the input device.

Embodiments of the inventive concepts encrypt content visually. In such case, the content being encrypted visually may include a one-time PIN or password, for example. In such way, only the user with the correct document key Kdoc can "see" the PIN code on his AR device. Thus, only that user would be able to input the correct PIN code into the input device.

Figure 11:
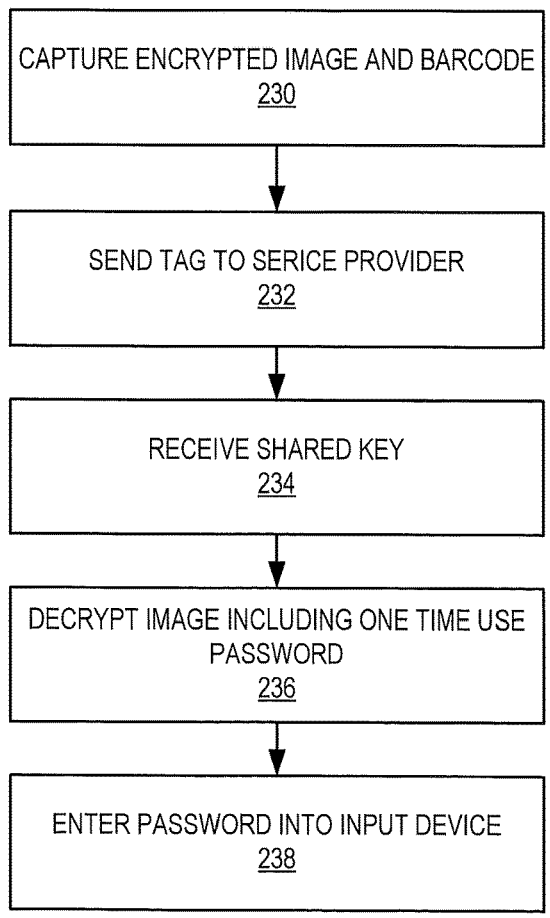
FIGS. 11 and 12 are flowcharts illustrating operations according to some embodiments.

Operations according to some embodiments that provide one-time use passwords are illustrated in FIG. 11. As shown therein, an encrypted image and a barcode including a tag are displayed to a user (Block 230). The encrypted image may include a one-time use password displayed thereon. The tag is then sent to an application server 104 operated, for example, by an authentication service provider (Block 232). Once the tag and the identity of the user are verified, the application server 104 sends a shared key SK to the user/AR device. (Block 234). The AR device then uses the SK to decrypt the image and display the image and the one-time use password (Block 236). The user may then enter the one-time use password into the input device (Block 238). Security of the transaction may thereby be enhanced.

Figure 12:
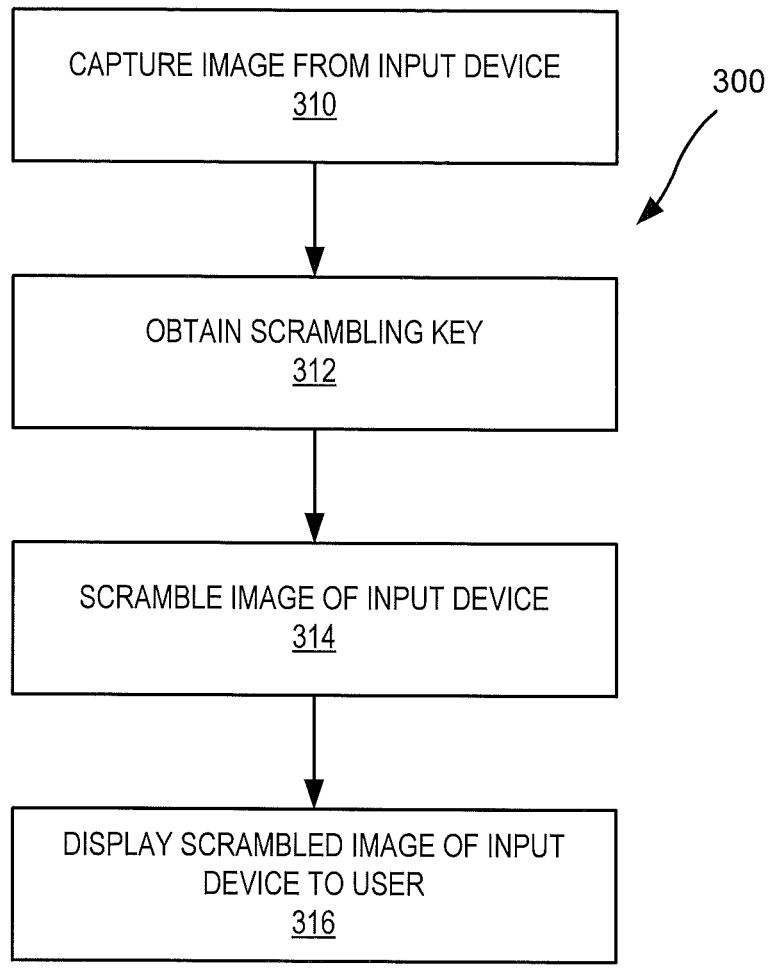

Operations 300 according to some further embodiments are illustrated in FIG. 12. These operations may be performed by an AR device 20. As shown therein, a plaintext image is captured from an input device, such as a touchscreen display or POS terminal (Block 310). A scrambling key K is then obtained (Block 312). The scrambling key K is then used to scramble the plaintext image (Block 314), and the scrambled image is displayed to the user (Block 316). The user may then interact with the input device using the scrambled image that is displayed to the user.

Figure 13:
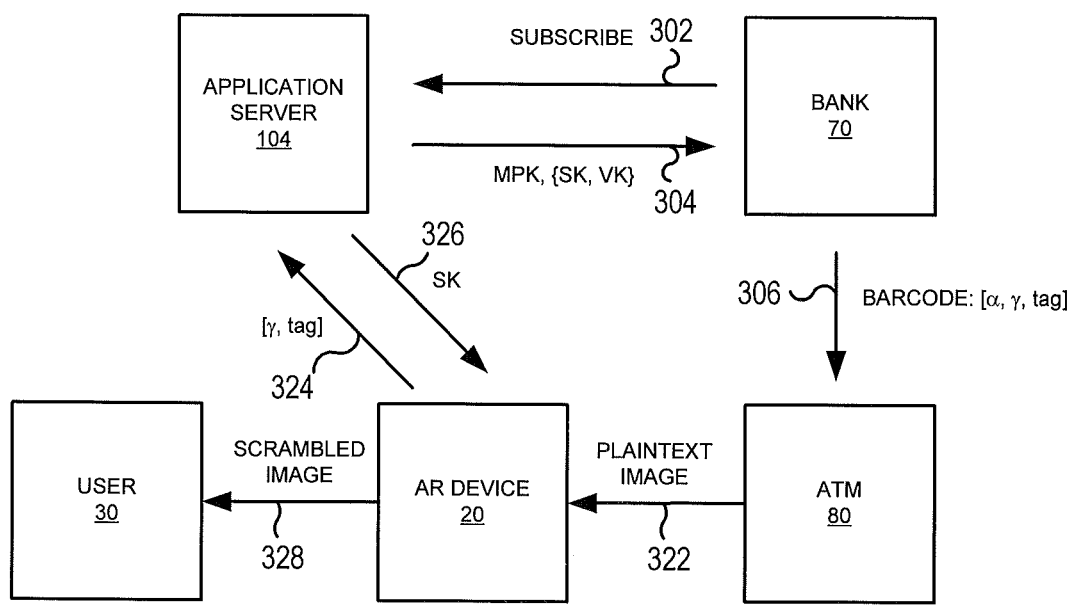
FIG. 13 is a block diagram illustrating message flows in a system according to further embodiments.

FIG. 13 is a block diagram illustrating message flows in systems according to some embodiments. The system illustrated in FIG. 10B includes an application server 104, a third party service provider, namely a bank 70, an input device, namely, an ATM 80 associated with the bank 70, and an AR device 20 that is operated by a user 30.

Referring to FIG. 13, the bank 70 subscribes to a secure input service offered by a service provider that operates the application server 104 (arrow 302). In response, the application server 104 provides the bank 70 with a master public key (MPK) associated with the application server 104 along with a symmetric key (SK) and verification key (VK) associated with the bank (arrow 304).

When a user wishes to interact with the ATM 80, he or she may initiate a secure interaction by, for example, pressing a designated button on the display. Alternatively or additionally, the AR 20 may be equipped with near field communications (NFC) or RFID communications capability that may communicate with the ATM to identify the user to the ATM. More traditional methods, such as swiping an ATM card, could also be used to identify the user to the terminal.

The bank 70 may then send (arrow 306) a barcode that can be displayed to the user that encodes an identification tag along with an encrypted copy ($\alpha$) of the scrambling key K and a signature ($\gamma$) that authenticates the tag using the symmetric key SK. The scrambling key may be encrypted using the master public key MPK and the tag. The tag may, for example, identify a userid (uid), a document id (docid), the bank name, and the date. That is, the tag may be defined as Tag:[uid, docid, Bank, Date]. The other parameters may be defined mathematically as:

$$\alpha = \text{Enc}_{MPK, tag}(\text{Kdoc}) \quad [7]$$

$$\gamma = \text{Sig}_{SK}(\text{Tag}) \quad [8]$$

The plaintext image is then displayed to the user (arrow 322), and is captured by the AR device 20.

The AR device 20 sends the tag and the signature $\gamma$ to the application server 104 (arrow 324). The application server 104 responds by providing the symmetric key SK to the AR Device 20 (arrow 326). The symmetric key SK is then used by the AR device 20 to decrypt the scrambling key K, and the scrambling key K is used to scramble the plaintext image. The scrambled image is then displayed to the user 30 (arrow 328), and the user interacts with the scrambled image as described above.

Scrambling may be performed by generating a random permutation (denoted as $\pi 1$) over the image and rearranging the image using the random permutation. In particular, the AR device 20 may generate a tuple $S_0 = (K, \pi 1, v\iota\lambda, v\iota\lambda, 0)$. The operations may parse S as $(K, \pi, \text{frame}, v, j)$. A random permutation $\pi 1'$ is generated over S, and a vector $(t_1, \ldots, t_n) = g(\pi 1(x), m, \text{frame}, \pi 1')$ is computed. The operations then set frame'=$(t_1, \ldots, t_n)$ and compute $ci = \text{Enc}_K(j, i, t_i)$ and $v' = \text{Encode}(c_1, \ldots, c_n)$. Finally, S is set as $(K, \pi', \text{frame}', v', j+1)$. The function g specifies the logic of the application given $\pi 1$.

FIG. 14 is a block diagram of an augmented reality device according to some embodiments. The AR device may include a hardware processor element 130 (e.g., a microprocessor, a central processing unit (CPU) and the like), a memory 122, (e.g., random access memory (RAM), read only memory (ROM), a disk drive, an optical drive, a magnetic drive, and/or a Universal Serial Bus (USB) drive), an image decryption unit 132 for decrypting images, an image scrambling unit 134 for scrambling plaintext images, and various input/output devices including an image capturing device 124, e.g., a camera, a video camera, etc., and a transceiver for communicating with the application server. Various other devices may also be included, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

FIG. 15 depicts a high-level block diagram of a general-purpose computer suitable for use in performing the functions described herein. For example, any one or more components or devices illustrated in FIG. 8 or described in connection with the methods 200 and 300 may be implemented as the system 400. As depicted in FIG. 15, the system 400 includes a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for decrypting a document, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

As will be appreciated by one of skill in the art, the present inventive concepts may be embodied as a method, data processing system, and/or computer program product. Furthermore, the present inventive concepts may take the form of a computer program product on a tangible, non-transitory computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method, comprising:
    superimposing an image of a virtual keypad over an image of a touchscreen keypad, wherein the virtual keypad has a different layout than the touchscreen keypad;
    mapping a first input on the touchscreen keypad to a second input on the virtual keypad, wherein the second input is different from the first input;
    displaying on the touchscreen keypad a visually encoded symbol that defines a positional mapping in two-dimensional space from the touchscreen keypad to the virtual keypad, wherein mapping the first input on the touchscreen keypad to the second input on the virtual keypad is performed in response to displaying the visually encoded symbol;
    capturing from the touchscreen keypad the visually encoded symbol that defines the positional mapping in two-dimensional space from the touchscreen keypad to the virtual keypad; and
    generating the image of the virtual keypad in response to capturing the visually encoded symbol;
    wherein the visually encoded symbol comprises a barcode.

2. The method of claim 1, wherein superimposing the image of the virtual keypad over the image of the touchscreen keypad comprises:
    generating a modified image of the touchscreen keypad including the virtual keypad superimposed over the touchscreen keypad; and
    displaying the modified image to a user.

3. The method of claim 1, further comprising reading the visually encoded symbol and generating the image of the virtual keypad in response to capturing the visually encoded symbol.

4. The method of claim 1, further comprising changing a positional mapping in two-dimensional space from the touchscreen keypad to the virtual keypad after receiving the first input on the touchscreen keypad.

5. The method of claim 4, wherein changing the positional mapping in two-dimensional space comprises rearranging input keys on the virtual keypad.

6. The method of claim 1, further comprising:
    capturing an encrypted image from the touchscreen keypad;
    generating a decrypted version of the encrypted image; and
    superimposing the decrypted version of the encrypted image over the touchscreen keypad.

7. A system, comprising:
    a processor; and
    a memory coupled to the processor and comprising computer readable program code embodied in the memory that is executable by the processor to perform operations comprising:
    superimposing an image of a virtual keypad over an image of a touchscreen keypad, wherein the virtual keypad has a different layout than the touchscreen keypad;
    mapping a first input on the touchscreen keypad to a second input on the virtual keypad, wherein the second input is different from the first input;
    displaying on the touchscreen keypad a visually encoded symbol that defines a positional mapping in two-dimensional space from the touchscreen keypad to the virtual keypad, wherein mapping the first input on the touchscreen keypad to the second input on the virtual keypad is performed in response to displaying the visually encoded symbol;
    capturing from the touchscreen keypad the visually encoded symbol that defines the positional mapping in two-dimensional space from the touchscreen keypad to the virtual keypad; and
    generating the image of the virtual keypad in response to capturing the visually encoded symbol;
    wherein the visually encoded symbol comprises a barcode.

8. The system of claim 7, wherein superimposing the image of the virtual keypad over the image of the touchscreen keypad comprises:
    generating a modified image of the touchscreen keypad including the virtual keypad superimposed over the touchscreen keypad; and
    displaying the modified image to a user.

9. The system of claim 7, wherein the operations further comprise:
reading the visually encoded symbol and generating the image of the virtual keypad in response to capturing the visually encoded symbol.

10. The system of claim 7, wherein the operations further comprise:
changing a positional mapping in two-dimensional space from the touchscreen keypad to the virtual keypad after receiving the first input on the touchscreen keypad.

11. The system of claim 10, wherein changing the positional mapping in two-dimensional space comprises rearranging input keys on the virtual keypad.

12. The system of claim 7, wherein the operations further comprise:
capturing an encrypted image from the touchscreen keypad;
generating a decrypted version of the encrypted image; and
superimposing the decrypted version of the encrypted image over the touchscreen keypad.

13. A computer program product, comprising:
a non-transitory computer readable storage medium comprising computer readable program code embodied in the medium that when executed by a processor causes the processor to perform operations comprising:
superimposing an image of a virtual keypad over an image of a touchscreen keypad, wherein the virtual keypad has a different layout than the touchscreen keypad;
mapping a first input on the touchscreen keypad to a second input on the virtual keypad, wherein the second input is different from the first input;
displaying on the touchscreen keypad a visually encoded symbol that defines a positional mapping in two-dimensional space from the touchscreen keypad to the virtual keypad, wherein mapping the first input on the touchscreen keypad to the second input on the virtual keypad is performed in response to displaying the visually encoded symbol;
capturing from the touchscreen keypad the visually encoded symbol that defines the positional mapping in two-dimensional space from the touchscreen keypad to the virtual keypad; and
generating the image of the virtual keypad in response to capturing the visually encoded symbol;
wherein the visually encoded symbol comprises a barcode.

14. The computer program product of claim 13, wherein superimposing the image of the virtual keypad over the image of the touchscreen keypad comprises:
generating a modified image of the touchscreen keypad including the virtual keypad superimposed over the touchscreen keypad; and
displaying the modified image to a user.

15. The computer program product of claim 13, wherein the operations further comprise:
reading the visually encoded symbol and generating the image of the virtual keypad in response to capturing the visually encoded symbol.

16. The computer program product of claim 13, wherein the operations further comprise:
changing a positional mapping in two-dimensional space from the touchscreen keypad to the virtual keypad after receiving the first input on the touchscreen keypad.

17. The computer program product of claim 16, wherein changing the positional mapping in two-dimensional space comprises rearranging input keys on the virtual keypad.

18. The computer program product of claim 13, wherein the operations further comprise:
capturing an encrypted image from the touchscreen keypad;
generating a decrypted version of the encrypted image; and
superimposing the decrypted version of the encrypted image over the touchscreen keypad.

* * * * *